UNITED STATES PATENT OFFICE.

JOHAN D. FREDERIKSEN, OF LITTLE FALLS, NEW YORK.

COMPOSITION FOR PRODUCING LACTIC FOOD PRODUCTS.

1,091,054.  Specification of Letters Patent.  Patented Mar. 24, 1914.

No Drawing.   Application filed July 23, 1913.   Serial No. 780,662.

*To all whom it may concern:*

Be it known that I, JOHAN D. FREDERIKSEN, a citizen of the United States, residing at Little Falls, in the county of Herkimer and State of New York, have invented a new and useful Improvement in Compositions for Producing Lactic Food Products, of which the following is a specification.

This invention relates to the production of food products in which milk, curdled by means of rennet ferment, is an ingredient.

In my Letters Patent No. 1,046,766, December 10, 1912, a composition is described which is used for curdling milk by the direct admixture to the milk of the composition in a dry state. That composition is available where milk can be obtained but is not available in the absence of milk.

The object of the present invention is to produce a dry composition which contains milk, skimmilk, or partially skimmed milk in a dry state mixed with rennet ferment also in a dry state, so that the desired food product containing the curdled milk can be produced by simply mixing the composition with water.

In practising this invention milk powder composed of dried full milk, skimmilk or partially skimmed milk is intimately mixed with rennet powder, the latter consisting of dry rennet ferment mixed with a very large proportion of sugar or salt. The dry composition also contains such flavoring and coloring ingredients as may be desirable for producing the desired ultimate product. Preferably it also contains a small admixture of a calcium salt, such as hypophosphite of calcium, the object of which is to restore to the dried milk the property of curdling firmly under the action of the rennet ferment, which property may have been partially destroyed by the evaporating process.

In this composition the rennet ferment is uniformly distributed throughout the mass and unequal coagulation is thereby avoided when the mixture is dissolved in water or a similar liquid. When strong liquid rennet-extract or rennet powder is added to milk, the milk particles in the immediate vicinity of the point at which the rennet ferment is supplied to the milk are apt to be coagulated much more quickly than the more remote parts of the milk and sometimes instantaneous coagulation takes place in part of the milk, thereby producing a coagulum or curd which is of very uneven firmness or texture. To counteract this the milk is usually stirred vigorously immediately when the rennet is added until perfect and intimate blending is secured. By mixing the rennet powder and the milk powder, as is done in practising the present invention, the particles of the two ingredients are brought into intimate and uniform proximity throughout the mass, the rennet ferment ready to act uniformly upon the adjacent milk particles and the latter ready to be so acted upon as soon as the condition for action is supplied by the addition of water or a similar liquid, and perfect uniformity is insured.

The period of time required for coagulating ordinary milk, skimmilk or partially skimmed milk depends mainly upon the strength of the rennet preparation, its proportion to the milk, the temperature of the milk and the condition of the milk as to acidity, bacteria contents, &c. Usually the strength of the rennet preparation and the temperature can be closely regulated but the condition of the milk, its acidity and the number and species of bacteria contained therein cannot be controlled and vary to such an extent that the period required for coagulation varies greatly, so that in the ordinary use of rennet for curdling milk the results are uncertain and lack uniformity. A proportion of rennet which would curdle sweet milk for pudding in five minutes may curdle milk which is perceptibly acid in one minute or sometimes even before the rennet can be thoroughly mixed with the milk, causing the curd to be sloppy and of uneven texture. With milk powder, on the other hand, the quality of the milk is definite and unchangeable, and the manufacturer of the composition described in this application can regulate it to a nicety so that, if a definite quantity of the powder is added to a definite quantity of water at a definite temperature, the time when coagulation will take place can be exactly determined.

In the composition covered by this application, the acidity of the dry milk is definite and unchangeable until it is dissolved and the proportion of rennet can be readily fixed by the manufacturer to a nicety, so that the user has only to mix the composition with a suitable exact amount of water or similar liquid at a certain temperature to make the coagulation take place in a definite time without danger of disturbing the process by stirring to thoroughly dissolve the powder.

The consistency or texture of the resulting food product depends upon the proportion of casein which is present in relation to the amount of water. In ordinary liquid milk this proportion and the consistency of the coagulum cannot be controlled. With milk powder, on the other hand, the consistency of the ultimate food product can be nicely regulated by using more or less of the milk powder or the finished composition for a given amount of water.

This dry composition is available for producing food products where milk cannot be obtained, as, for instance, in camp, on board ship, in the arctic and tropical regions, or in the home when the supply of milk has been consumed.

The flavor can be of any desired character and the flavoring ingredient can be incorporated with the sugar and, if necessary, a gelatinous substance to hold it, such as gum tragacanth, as described in Letters Patent No. 1,046,766. As an illustration the following formula may be given:—In case the flavor is vanilla, about 216 cubic centimeters of a concentrated extract of vanilla, preferably about ten times stronger than the usual flavoring extract of commerce, and a coloring ingredient, if such is desired, are mixed with forty-three grams of gum which has been soaked in water so as to form a smooth paste. This mixture is then added to and thoroughly incorporated in about thirty-two pounds of finely granulated sugar, and the whole mixture is dried at a low temperature, say about 120° F. It is then ground into a moderately fine powder and thoroughly mixed with about ten grams of rennet powder and about fifty-seven grams of hypophosphite of calcium. Other flavors, such as orange, lemon, maple, pistachio, raspberry, coffee, chocolate, &c., may be incorporated in a similar way, with or without a gelatinous substance as a conveyer.

By adding one part, by weight, of the above dry mixture to one part of milk powder consisting of dried skimmilk, and adding 3½ ounces of this composition to one pint of water at 100° F., stirring for one or two minutes and then letting the solution stand at rest, a firm pudding will be produced in seven minutes.

For producing soft cheese, such as Neuchâtel or cream cheese, an exceedingly small quantity of rennet ferment is mixed with the milk powder, sufficient to curdle the watery solution in from 18 to 24 hours.

I claim as my invention:

1. A dry composition for producing lactic food products, comprising milk powder and rennet powder intimately mixed, which composition dissolves and curdles upon the addition of water.

2. A dry composition for producing lactic food products, comprising milk powder, rennet powder and a calcium salt intimately mixed, which composition dissolves and curdles upon the addition of water.

3. A dry composition for producing lactic food products comprising milk powder and a pulverized mixture of rennet ferment, a calcium salt and sugar.

4. A dry composition for producing lactic food products comprising milk powder, rennet powder, a calcium salt, sugar and a flavoring ingredient.

Witness my hand in the presence of two subscribing witnesses.

JOHAN D. FREDERIKSEN.

Witnesses:
S. J. SECKNER,
E. TOBORG.